United States Patent [19]
Nasu

[11] Patent Number: 5,462,661
[45] Date of Patent: Oct. 31, 1995

[54] SOLID-LIQUID SEPARATOR FOR SLUDGE

[76] Inventor: Motohito Nasu, 21-21, Harayama 4-chome, Urawa-shi, Saitama-ken, Japan

[21] Appl. No.: 158,617

[22] Filed: Nov. 29, 1993

[30] Foreign Application Priority Data

Apr. 12, 1993 [JP] Japan ................... 5-107231

[51] Int. Cl.$^6$ .................. C02F 1/52; C02F 11/14
[52] U.S. Cl. .......... 210/206; 210/218; 210/219; 210/220; 210/258; 210/738
[58] Field of Search ............... 210/258, 199, 210/208, 218, 221.2, 220, 738, 752, 206, 207, 219

[56] References Cited

U.S. PATENT DOCUMENTS

| | | | |
|---|---|---|---|
| 2,415,048 | 1/1947 | Sharp | 210/199 |
| 2,766,203 | 10/1956 | Brown et al. | 210/199 |
| 4,155,851 | 5/1979 | Michael | 210/105 |
| 4,199,828 | 4/1980 | Hellers | 4/321 |
| 4,238,338 | 12/1980 | Kinzer | 210/195.4 |
| 4,265,753 | 5/1981 | Manuel | 210/199 |
| 4,376,702 | 3/1983 | Small | 210/218 |
| 4,710,290 | 12/1987 | Briltz | 210/199 |
| 4,784,764 | 11/1988 | Kleinschnittger et al. | 210/199 |

*Primary Examiner*—Neil McCarthy
*Attorney, Agent, or Firm*—Woodling, Krost & Rust

[57] ABSTRACT

A solid-liquid separator for sludge which includes a tank with a sludge suction port, an intake/exhaust port and a sludge discharge port. A plurality of agitating blades are mounted on a rotatable shaft within the tank and are capable of being driven in either of two rotational directions. A plurality of injection nozzles are internally mounted on the bottom of the tank in such a manner as to eject a mixture of sludge coagulant and air into sludge contained within the tank. A pump which is capable of producing a vacuum or pressure is connected to the intake/exhaust port so as to produce either a vacuum or a pressure within the tank and the sludge suction port is adapted to be connected to a source of sludge to intake the sludge into the tank. The injection nozzles are connected to a source of sludge coagulant and air. The disclosure also relates to the method of treating the sludge to separate into solid and liquid phases.

2 Claims, 3 Drawing Sheets

5,462,661

SOLID-LIQUID SEPARATOR FOR SLUDGE

BACKGROUND OF THE INVENTION

1. Field of the Invention

The present invention relates to a separator for efficiently separating sludge into solid and liquid phases in a recovery tank for solidifying the sludge, thereby facilitating the disposal thereof.

2. Prior Art

Sludge is not easily separated into solid matter and water content, and accordingly, technical development has been demanded for solidifying sludge to a state practicable for disposal of the same. In recent years, chemicals for solidifying sludge have been studied; however, the solidification of the sludge using these chemicals does not obtain satisfactory results.

For example, a sludge solidifying technique on its way to development has a construction as shown in FIG. 4 of the drawings of the application. In FIG. 4, a sludge coagulant and a gas are injected through an injection port N mounted on one end of the bottom portion of the tank T into recovered sludge D in the tank T. Then, the interior of the tank T is evacuated by vacuum by way of a vacuum pump (not shown) through an exhaust port A mounted in the upper portion of the tank T, so that the gas injected through the injection port N together with the sludge coagulant is passed through the sludge D as rising bubbles. Thus the sludge coagulant is raised in the gas and reacts with the sludge D to separate the sludge into solid and liquid phases. The sludge thus separated into solid and liquid is discharged from the interior of the tank T, and dewatered and filtered, to be solidified.

SUMMARY OF THE INVENTION

The prior art described above, however, has the following disadvantage. Namely, sludge in the vicinity of the injection port N reacts with the coagulant to be separated into solid and liquid; however, sludge in the area shown by slant lines in FIG. 4 other than the vicinity of port N does not have an opportunity to react with the coagulant, and is not separated into solid and liquid. Accordingly, the solid-liquid separation of sludge in the sludge recovery tank is insufficient, which prevents satisfactory disposal of the sludge.

According to the present invention, a plurality of injection nozzles are provided for injecting a sludge coagulant together with a gas into the bottom portion of a sludge recovery tank in a manner indicated by the dotted lines in FIG. 3, and a plurality of agitating blades are also installed in the tank.

A sludge discharge port of a sludge recovery tank is closed, and air in the tank is discharged through an intake/exhaust port provided on the upper portion of the tank so that the interior of the tank is applied with a negative pressure. After that, a sludge suction port of the sludge recovery tank is opened, and sludge is sucked into the tank using the negative pressure in the tank.

When the amount of the sludge in the recovery tank reaches a specified value, the sludge suction port is closed to stop the suction of the sludge into the tank.

Next, by opening a plurality of sludge coagulant nozzles disposed on the bottom portion of the tank in the dotted manner seen in FIG. 3, a coagulant and a gas are sucked and injected into the recovery tank kept at the negative pressure, from a coagulant container opened to atmospheric pressure.

The gas injected from a plurality of the injection nozzles disposed in the dotted manner shown in FIG. 3 become bubbles and, as shown in FIG. 3, are diffused over the whole area of the sludge in the tank accompanying the coagulant, thereby allowing the coagulant to react with the sludge.

Further, a plurality of agitating blades installed in the tank are rotated and agitate the sludge mixed with the coagulant to equalize the reaction between the coagulant and the sludge, thus promoting the solid-liquid separation of the sludge.

After the completion of the solid-liquid separation of the sludge is checked, the agitating blades are stopped, the injection nozzles are closed, and the evacuation through the intake/exhaust port on the upper portion of the tank is stopped.

The tank is tilted on a sludge discharge port side, and atmospheric air is press-fed into the tank by switching the operation of the intake/exhaust pump. Thus, the sludge discharge port on the one end of the bottom of the tank is opened while the interior of the tank is pressurized, and the sludge separated into solid and liquid is separated through a suitable filter means, and only the solidified sludge is recovered. The sludge thus recovered is dried and discarded.

DESCRIPTION OF PREFERRED EMBODIMENT

Figure 1:
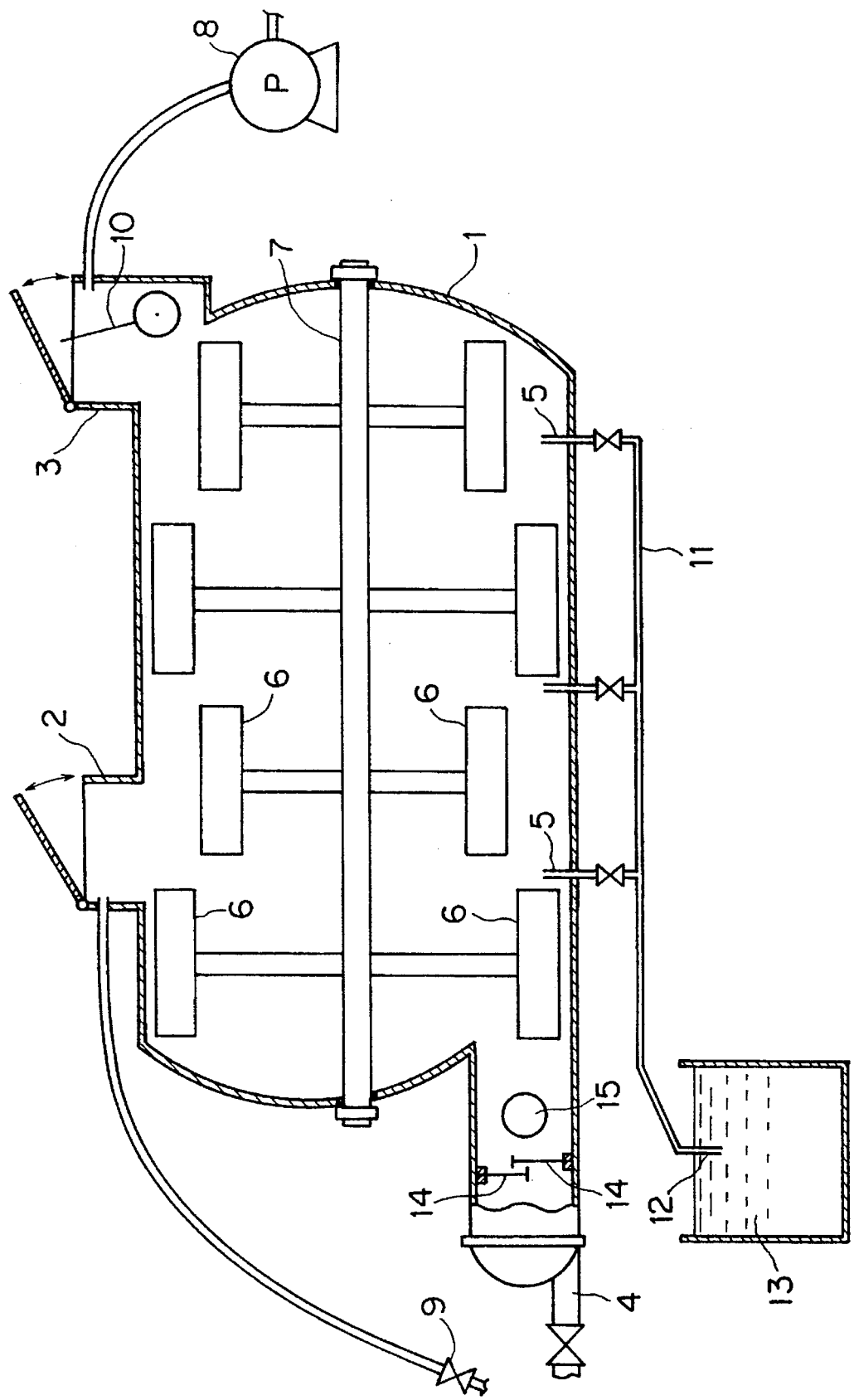
FIG. 1 is an illustrative front sectional view of the present invention.
Figure 2:
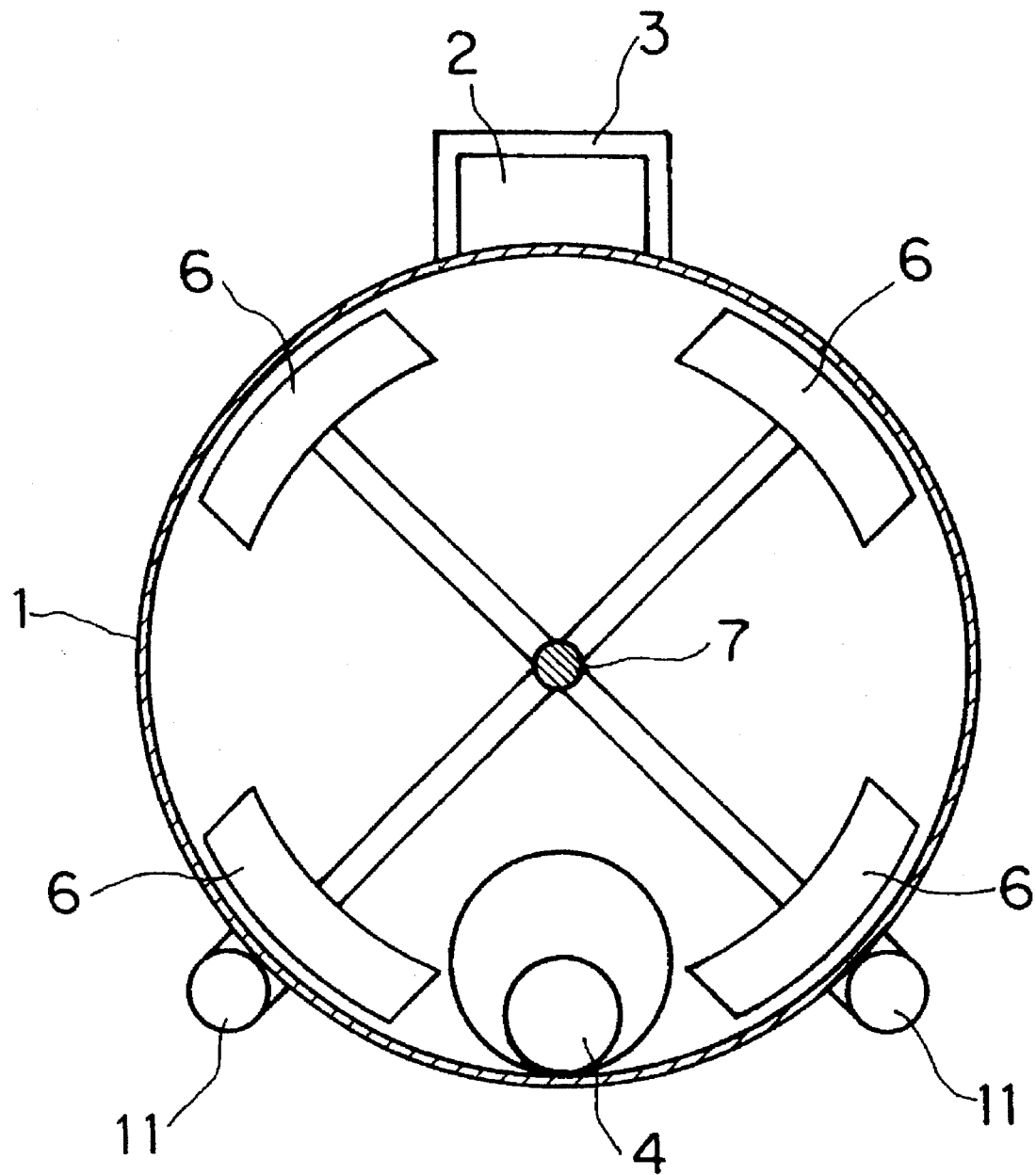
FIG. 2 is an illustrative side sectional view of the present invention.

FIG. 1 is an illustrative front view of the interior of a sludge recovery tank 1, and FIG. 2 is an illustrative side view of the interior of the sludge recovery tank. In the sludge recovery tank 1, a sludge recovery port 2 and an intake/exhaust port 3 are provided in an upper portion, and a sludge discharge 4 is provided on one end of a bottom portion. Further, a plurality of sludge coagulant injection nozzles 5 are disposed on a bottom portion of the tank 1 and adapted to be opened to provide ingress of fluid into the tank 1 as illustrated in dotted lines in FIG. 3.

In addition, a rotational shaft 7 with a plurality of connected agitating blades 6 is transversely installed in the tank 1.

An intake/exhaust pump 8 is connected to the intake/exhaust port 3 and is capable of rotation for evacuation, i.e. produce a vacuum, so that the interior of the tank 1 is applied with a negative pressure. After that, as a sludge suction port 9 of a suction pipe communicated to the sludge recovery port 2 is opened, sludge is sucked into the tank 1 and kept in the negative pressure state.

When the recovered sludge in the tank reaches a specified amount, a float valve 10 in the tank operates to close the sludge suction port 9, thus stopping introduction of sludge into the tank.

Figure 3:
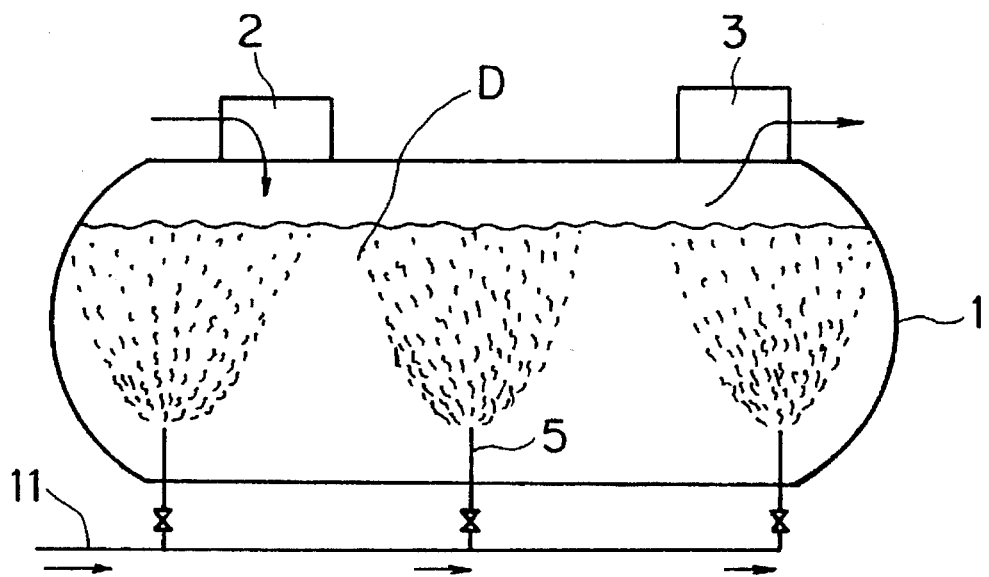
FIG. 3 is an illustrative view for explaining the diffusion and floating of bubbles in a tank.
Figure 4:
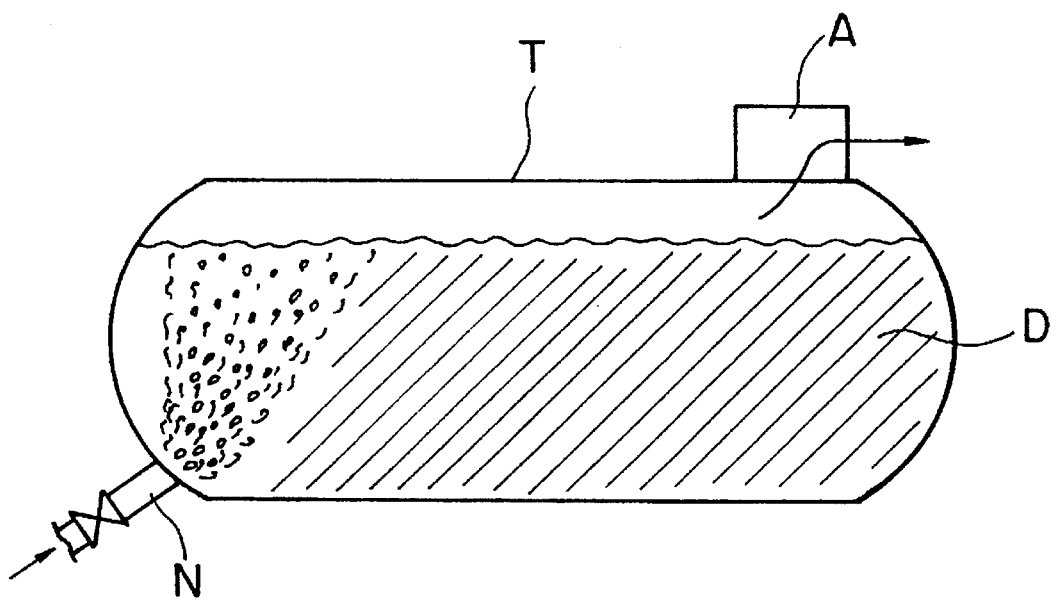
FIG. 4 is an illustrative view for explaining the diffusion and floating of bubbles in a prior art sludge recovery tank.

Next, by opening a plurality of sludge coagulant injection nozzles 5, a suction port 12 of a feed pipe 11 communicated to the nozzle 5 is opened to atmospheric air. As a result, since the intake/exhaust pump 8 is continuously rotated for evacuation, atmospheric air is sucked into the tank 1 kept in the negative pressure state through the suction port 12. The air sucked into the tank is, as shown in FIG. 3, diffused and floated in the sludge as bubbles. The magnitude of the injection force of the atmospheric air can be adjusted according to the viscosity and specific gravity of the sludge.

After the bubbles are checked for diffusion and floating state in the tank, the suction port 12 of the feed pipe 11 is opened in the sludge coagulant 13. Thereby, the sludge coagulant 13 is sucked through the feed pipe 11 and is injected in the tank 1 through the nozzles 5. Then, by opening the suction port 12 of the feed pipe to the atmospheric air again, the atmospheric air is injected into the tank to generate the diffusion of the bubbles. By concurrently operating the agitating blades 6, the sludge coagulant is mixed and reacts with the sludge.

The rate and direction of rotation of the agitating blades 6 can be adjusted according to the specific gravity and the viscosity of the sludge. Further, by rotating the agitating flow clockwise or counterclockwise depending on the shapes of the blades, it is possible to exert a mixing reaction between the sludge coagulant and the sludge in the tank 1 up to the corners of the tank along with the diffusion of the bubbles.

After the sludge coagulant is sufficiently mixed and reacted with the sludge (checked through an inspection window not shown) and the sludge in the tank 1 is separated into solid and liquid, the operation of the agitating blades 6 is stopped. The suction port 12 of the feed pipe 11 is closed, and the intake/exhaust pump 8 is switched to the intake-rotation mode. Thus, air is fed into the tank, and the interior of the tank 1 is pressurized.

The tank 1 is then tilted, and the sludge discharge port 4 is thus directed downwardly to be opened so that the sludge separated into solid and liquid is forced out from the discharge port 4 by the inner pressure in the tank. The sludge thus forced out is released and dewatered in a filter apparatus, to be formed into a sludge solid matter which is a practicable form for discarding disposal.

Additionally, when foreign matter entrapped and recovered in the sludge are discharged in the filter apparatus and the like, they tend to damage the filter apparatus. In order to prevent the above damage due to foreign matter, weir plates 14 for catching the foreign matter before the discharge thereof may be provided in the vicinity of the discharge port 4. The foreign matter may be taken off through a foreign matter taking-off port 15 provided in the vicinity of the weir plates 14 after discharge of the sludge.

According to the present invention, a plurality of injection nozzles for a sludge coagulant and air are mounted on the bottom of the tank in such a manner as to be opened and to function in a manner illustrated in dotted lines in FIG. 3. Thus, by injecting air prior to the injection of sludge coagulant, bubbles diffused in the sludge allow the sludge coagulant to permeate in the depth of the sludge so that the reaction between the sludge coagulant and the sludge is performed through diffusion. Further, after injection of the coagulant, the agitating blades are rotated while the air is injected into the tank again, and thus the sludge coagulant is further mixed and agitated with the sludge. As a result, since the mixing action is enlarged over the whole area of the interior of the tank and the bubbles are floated over the whole area, the reaction between sludge and sludge coagulant is exerted over the whole area of the interior of the tank. This makes it possible to efficiently secure the solid-liquid separation of the sludge in the tank. Further, even when the sludge separated into solid and liquid is discharged from the tank, it can be dewatered by a suitable means, resulting in the solid state being practicable in the discarding disposal of the sludge. Therefore, the present invention has the significant effects.

The invention has been described in detail with particular emphasis on the preferred embodiments thereof, but it should be understood that variations and modifications within the spirit and scope of the invention may occur to those skilled in the art to which the invention pertains.

What is claimed is:

1. A solid-liquid separator for sludge comprising:

a sludge recovery tank including a sludge suction port and an intake/exhaust port movable between open and closed positions and provided at an upper portion of said tank, and a sludge discharge port movable between open and closed positions and provided at one end of a bottom portion of said tank;

a plurality of agitating blades capable of being driven in normal and reverse rotations installed in said tank;

a plurality of injection nozzles for a sludge coagulant and air are internally mounted on said bottom portion of said tank enabling injection of coagulant and air evenly and into the entire volume of sludge contained in the tank;

means connecting said intake/exhaust port to an intake/exhaust pump;

said intake/exhaust pump operating in the exhaust mode creating a vacuum in said sludge recovery tank prior to and during entry of sludge into said sludge recovery tank;

said intake/exhaust pump operating in the exhaust mode creating a vacuum in said sludge recovery tank during injection of coagulant and air into said sludge recovery tank; and said intake/exhaust pump operating in the intake mode pressurizing said sludge recovery tank during discharge of sludge from said sludge recovery tank.

2. A solid-liquid separator for sludge comprising:

a sludge recovery tank including first and second end portions and upper and lower portions, a sludge suction port in said tank adapted to be connected to a source of sludge to be treated, an intake/exhaust port provided at an upper portion of said tank, a sludge discharge port movable between open and closed positions and provided in a bottom portion of said tank;

a plurality of agitating blades mounted in said tank for movement therein in a plurality of directions;

a plurality of injection nozzles adapted to inject a sludge coagulant and air are mounted on the bottom portion of said tank in such manner as to vertically eject coagulant and air into sludge contained within said tank;

a source of pressure and vacuum;

means connecting said intake/exhaust port said source of pressure and vacuum;

said vacuum source creating a vacuum in said sludge recovery tank prior to and during entry of sludge into said sludge recovery tank;

said vacuum source creating a vacuum in said sludge recovery tank during injection of coagulant and air into said sludge recovery tank; and, said pressure source pressurizing said sludge recovery tank during discharge of sludge from said sludge recovery tank.

\* \* \* \* \*